(12) United States Patent
Eberhardt et al.

(10) Patent No.: US 7,093,462 B2
(45) Date of Patent: Aug. 22, 2006

(54) MULTI-WAY VALVE AND REFRIGERATING MACHINE WITH MULTI-WAY VALVE

(75) Inventors: Hans-Frieder Eberhardt, Giengen-Burgberg (DE); Rolf Kordon, Giengen (DE); Michael Neumann, Ulm (DE); Udo Wenning, Giengen/Brenz (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/873,496

(22) Filed: Jun. 21, 2004

(65) Prior Publication Data

US 2005/0005634 A1    Jan. 13, 2005

Related U.S. Application Data

(63) Continuation of application No. PCT/EP02/13808, filed on Dec. 5, 2002.

(30) Foreign Application Priority Data

Dec. 19, 2001   (DE)   ................. 101 62 502

(51) Int. Cl.
 *F25B 39/02* (2006.01)
(52) U.S. Cl. ........................................ 62/525
(58) Field of Classification Search .............. 62/498, 62/504, 525, 324.6; 137/625.48
See application file for complete search history.

(56) References Cited

U.S. PATENT DOCUMENTS

| | | | | |
|---|---|---|---|---|
| 3,756,281 A | * | 9/1973 | Gravert | 137/625.48 |
| 3,761,054 A | * | 9/1973 | Abdo | 251/172 |
| 4,273,027 A | * | 6/1981 | Reinhard et al. | 91/32 |
| 4,570,904 A | * | 2/1986 | Mullally | 251/129.21 |
| 4,655,253 A | * | 4/1987 | Ourensma | 137/614.18 |
| 4,736,587 A | | 4/1988 | Suzuki | |
| 4,852,612 A | * | 8/1989 | Bucko, Sr. | 137/625.5 |
| 4,877,057 A | * | 10/1989 | Christensen | 137/625.48 |
| 4,877,058 A | * | 10/1989 | Stoll | 137/625.48 |
| 4,973,024 A | | 11/1990 | Homma | |
| 5,152,320 A | * | 10/1992 | Zimmerly | 137/625.5 |
| 5,160,233 A | * | 11/1992 | McKinnis | 411/433 |
| 5,184,643 A | * | 2/1993 | Raymond | 137/625.48 |
| 5,189,991 A | * | 3/1993 | Humburg | 123/41.1 |
| 5,211,371 A | * | 5/1993 | Coffee | 251/11 |
| 5,247,966 A | * | 9/1993 | Stevens et al. | 137/625.69 |
| 5,261,597 A | * | 11/1993 | Perlman et al. | 236/93 R |
| 6,058,723 A | * | 5/2000 | Kusunoki et al. | 62/156 |

FOREIGN PATENT DOCUMENTS

| | | | |
|---|---|---|---|
| DE | 004020537 A1 | * | 1/1992 |
| DE | 198 22 735 A1 | | 11/1999 |
| JP | 57018875 A | | 1/1982 |
| JP | 02057776 A | | 2/1990 |
| JP | 411257764 A | * | 9/1999 |
| WO | WO 92/14083 | * | 8/1992 |

* cited by examiner

*Primary Examiner*—Mohammad M. Ali
(74) *Attorney, Agent, or Firm*—John T. Winburn; Russell W. Warnock; Craig J. Loest

(57) ABSTRACT

A multi-way valve, particularly for a refrigerant circuit, includes a housing having a number of inlets and outlets and a chamber with a number of seats respectively associated with an inlet or outlet. The multi-way valve also includes a closing element that can move between the seats and at least one actuator, which is provided in the form of an element made of a shape-memory alloy and capable of being displaced from one of the seats when the closing element is heated. The direction of displacement is transversal to the normal direction of the seat.

34 Claims, 2 Drawing Sheets

MULTI-WAY VALVE AND REFRIGERATING MACHINE WITH MULTI-WAY VALVE

CROSS-REFERENCE TO RELATED APPLICATION

This application is a continuation, under 35 U.S.C. § 120, of copending international application No. PCT/EP02/13808, filed Dec. 5, 2002, which designated the United States; this application also claims the priority, under 35 U.S.C. § 119, of German patent application No. 101 62 502.2, filed Dec. 19, 2001; the prior applications are herewith incorporated by reference in their entirety.

BACKGROUND OF THE INVENTION

Field of the Invention

The present invention relates to a multi-way valve and to a refrigerating machine having a circuit in which the multi-way valve is inserted.

Such multi-way valves or refrigerating machines are used, for example, in refrigerators that have a plurality of cooling compartments capable of being regulated in each case by a specific evaporator to temperatures that can be set independently of one another; they serve, there, for apportioning the refrigerant stream to one or more evaporators. The multi-way valves used at the present time in refrigerating machines are, generally, solenoid valves. These valves have a housing with a plurality of valve seats and with a closing member movable between stable positions, in each case on one of the valve seats, by magnetic force.

A solenoid valve, not actuated magnetically, having a housing with a plurality of inlets and outlets and a chamber with a plurality of valve seats associated, in each case, with an inlet or outlet is disclosed in German Published, Non-Prosecuted Patent Application DE 198 22 735 A1. The housing of this known multi-way valve includes three chambers: a middle chamber, in which a closing member is movable between two seats on opposite side walls; and two lateral chambers, into which the orifices of the valve seats issue and in each of which a spring of a form memory alloy is accommodated. The two springs press onto the closing member in the middle chamber in each case through a piston and a rod extending through the orifice of the respective valve seat. By heating a first of the two lateral chambers, the spring located therein is lengthened and presses the closing member against the valve seat leading to the second lateral chamber, the spring, at the same time, compressing the spring in the second lateral chamber.

To displace the closing body from one seat to the other, a spring not only has to apply the force necessary for deforming the other spring in each case, but, furthermore, a force that corresponds to the product of the pressure difference between the central and the lateral chamber and the cross-sectional area of the valve seat orifice. There is, therefore, the risk that, if the pressure difference is too high, the multi-way valve does not change over reliably.

SUMMARY OF THE INVENTION

It is accordingly an object of the invention to provide a multi-way valve and refrigerating machine with multi-way valve that overcome the hereinafore-mentioned disadvantages of the heretofore-known devices of this general type and that can be changed over with the aid of a form memory alloy element and has a function capacity that is not impaired even by a high pressure difference at a closed valve seat.

With the foregoing and other objects in view, there is provided, in accordance with the invention, a multi-way valve, including a housing having a plurality of inlets and outlets and valve seats associated with a respective one of the inlets and outlets, the housing defining a chamber fluidically connected to the valve seats, a closing member movable between the valve seats, and at least one actuator of a form memory alloy that, under heating, displaces the closing member from one of the valve seats to another of the valve seats in a displacement direction transverse to a normal direction of at least one of the valve seats.

With the objects of the invention in view, in a refrigerating machine having a refrigerant circuit with a plurality of evaporators, there is also provided a switching device including a multi-way valve of the invention disposed in the refrigerant circuit and fluidically connected to at least one of the evaporators.

Because the direction in which the closing member is displaced from the seat is placed substantially transversely to the normal direction of the seat, the force acting in the normal direction and resulting from the pressure difference does not need or at most needs to a slight extent to be overcome to displace the closing member from its seat.

In accordance with another feature of the invention, the closing member is spherical. When the closing member is spherical, it can be displaced from its seat in a rolling movement so that no appreciable frictional resistance has to be overcome for displacement. Furthermore, the ball shape makes leak-tight closing-off of a circular valve seat easier.

In accordance with a further feature of the invention, to ensure that the closing member cannot escape from the surroundings of the valve seat and always closes one of these in a state of rest, the closing member is, preferably, held in a slide that can be displaced by the actuator to displace the closing structure.

In accordance with an added feature of the invention, the slide defines a receptacle therewithin and the closing member is held within the receptacle.

In accordance with an additional feature of the invention, the valve seats are two valve seats, the closing member moves in the slide in the displacement direction, and a freedom of movement of the closing member in the slide is less than a distance between the two valve seats.

Preferably, furthermore, the closing member is movable in the displacement direction in the slide itself, the freedom of movement of the closing member in the slide being lower than the distance between two seats. This, on one hand, ensures that, in each position of rest of the slide, the closing member can close in each case only one valve seat corresponding to this position, and, on the other hand, a movement of the slide between adjacent positions of rest, which is smaller than the distance between two adjacent seats, is sufficient to displace the closing member so far from one of the two seats that it no longer closes this and, unobstructed by the slide, can assume a closing position at a second valve seat.

In accordance with yet another feature of the invention, the multi-way valve, preferably, includes a spring-elastic valve for exerting on the closing member a counterforce that counteracts the displacement of the closing member from each seat. Such a spring element keeps the closing member firmly against the seat, even when no fluid is flowing through the valve, and, consequently, the pressure difference between the middle chamber and the secondary chamber shut off by the closing member disappears, even when the pressure in the secondary chamber becomes slightly higher than in the central chamber.

In accordance with yet a further feature of the invention, the chamber has a first side wall, the valve seats are disposed on the first side wall, and the spring-elastic element acts on the closing member in a direction of the first side wall. This spring-elastic element may, expediently, be a leaf spring.

In accordance with yet an added feature of the invention, the seats are, preferably, located on the same side wall of the chamber so that a single spring-elastic element preferably disposed on an opposite side wall of the housing is sufficient to act upon the closing member in each case in the direction of these seats.

To change over the multi-way valve between its different switching positions, each spring-elastic element serving as an actuator and being of form memory alloy is, preferably, assigned an electrical heating device for the selective heating of the element.

In accordance with yet an additional feature of the invention, the heating device may be a heating resistor wound around the housing of the multi-way valve in the vicinity of the associated actuator or a heating resistor wound around the element itself. The first alternative is especially simple and cost-effective because, for the electrical supply of the heating device, there is no need for wires to be led through the housing; the second alternative has the advantage that it allows faster reaction times of the multi-way valve, particularly when the heating device can be cooled by direct contact with fluid flowing through the valve.

In accordance with again another feature of the invention, the heating devices are to be cooled in direct contact by fluid flowing through the valve.

In accordance with again a further feature of the invention, fluid flows through the inlets to the chamber and out the outlets, the heating devices are disposed in the housing, and the heating device are to be cooled in direct contact by fluid flowing through the housing.

In accordance with again an added feature of the invention, at least part of the heating device is disposed outside the housing.

In accordance with again an additional feature of the invention, the heating devices are disposed outside the housing.

In accordance with a concomitant feature of the invention, the housing and the actuator are integral and the housing and the actuator are of a one-piece form memory alloy.

Other features that are considered as characteristic for the invention are set forth in the appended claims.

Although the invention is illustrated and described herein as embodied in a multi-way valve and refrigerating machine with multi-way valve, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
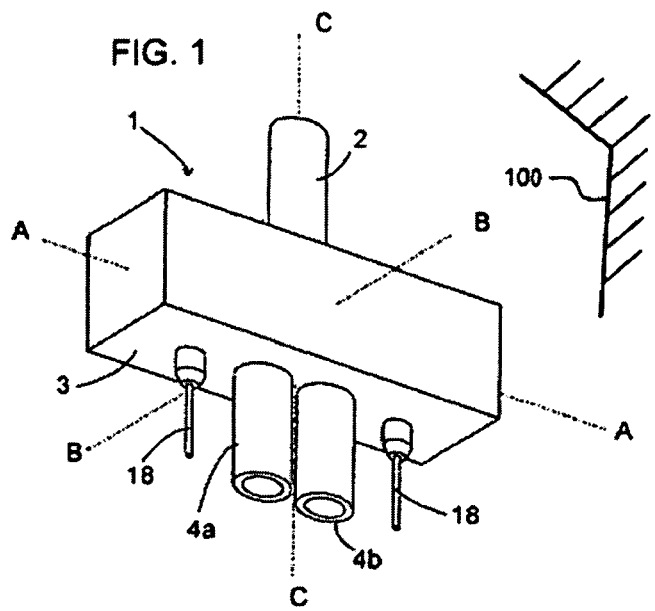
FIG. 1 is a fragmentary perspective view of a first embodiment of a multi-way valve according to the invention.

Referring now to the figures of the drawings in detail and first, particularly to FIG. 1 thereof, there is shown a multi-way valve according to the invention, with a housing 1 of metal, which has, on one housing side (here, the top side facing away from the viewer), an inlet connection 2 and, on the opposite housing underside 3, two outlet connections 4a, 4b for a fluid. Two current leadthroughs 18 are, likewise, led on the underside 3 into the interior of the housing 1 so as to be insulated relative to the latter. A ground connection is connected directly to the housing at any desired point and is not illustrated in FIG. 1.

Figure 2:
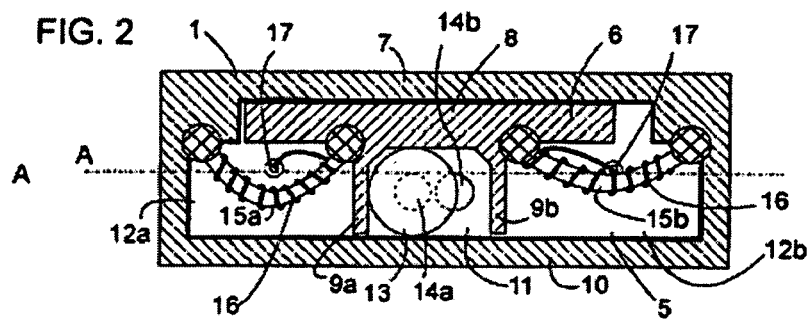
FIG. 2 is a cross-sectional view through the multi-way valve of FIG. 1 along a plane defined by lines A and B in FIG. 1.

FIG. 2 shows a "horizontal" section through the multi-way valve of FIG. 1 in the plane defined by the lines A and B of FIG. 1. A slide 6 of an electrically nonconductive material, for example, a plastic, is mounted displaceably in the direction of the line A in a chamber 5 inside the housing 1. The slide 6 includes a base plate 8 guided displaceably along a side wall 7 of the housing 1 and two legs 9a, 9b that, starting from the base plate 8, extend as far as a short distance from the opposite side wall 10 of the housing 1. The legs 9a, 9b subdivide the chamber 5 into a central chamber 11 between the two legs 9a, 9b and two lateral chambers 12a, 12b in each case on the far side of the legs 9a, 9b.

A ball 13 functioning as a closing member is accommodated in the central chamber 11. In the configuration of the multi-way valve, as shown in FIG. 2, the ball 13 lies centrally on a left valve seat 14a formed on the bottom of the chamber 5 and, thus, shuts off the outlet connection 4a associated with this valve seat 14a (see also FIG. 3). A second right valve seat 14b, which belongs to the right outlet connection 4b, is open. The distance between the legs 9a, 9b is selected such that, in the illustrated position of the slide 6, in which the distance from the center point of the valve seat 14a to the nearest leg 9a is slightly greater than the radius of the ball 13, the corresponding distance of the right valve seat 14b from the leg 9b nearest to it is smaller than this radius. In this position of the slide 6, therefore, the ball 13, even if it were to lose its place on the seat 14a because of vibration or the like, cannot shut off the seat 14b.

The two lateral chambers 12a, 12b accommodate elements of a form memory alloy, here in the form of curved bars 15a, 15b, which are connected in each case at one end to the housing 1 and at another end to the slide 6. In the illustrated configuration of the multi-way valve, the slide 6 is in the vicinity of its left stop, and the bar 15a in the left lateral chamber 12a is curved to a greater extent than the bar 15b in the right lateral chamber 12b. A wire 16, which forms a heating resistor, is wound around each bar 15a, 15b. A first end of each resistance wire 16, the first end facing the electrically nonconductive slide 6, is connected to the conductor 17 of the electrical leadthrough 18; the other end of the resistance wire 16, in each case, is connected to ground through the housing 1.

Figure 3:
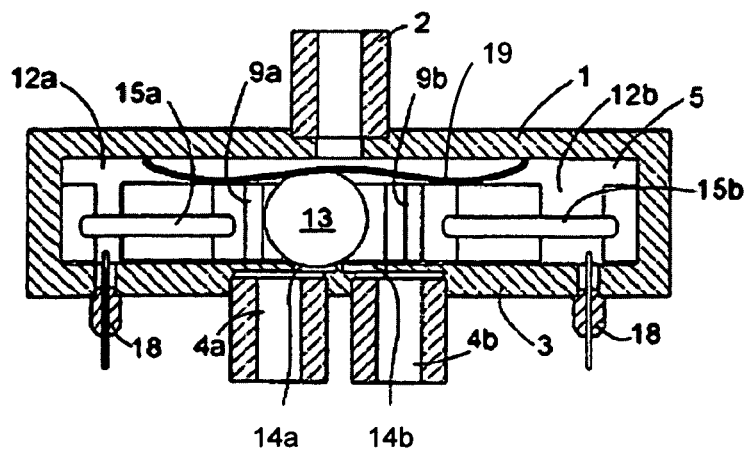
FIG. 3 is a cross-sectional view through the multi-way valve of FIG. 1 along a plane defined by lines A and C in FIG. 1.

FIG. 3 shows a section through the multi-way valve of FIG. 1 in the plane defined by the lines A and C of FIG. 1. The height of the slide 6 is smaller than the diameter of the ball 13, and a leaf spring clamped above the slide 6 between the ball 13 and the top side of the housing 1 exerts on the ball a downwardly directed force that keeps the ball 13 firmly pressed against the seat occupied by it in each case, here seat 14a.

By acting upon one of the two resistance wires 16 selectively with current, the bar 15a or 15b wound around with the wire 16 is heated and changes into its respective memory form corresponding to the heated state. As a result, the slide 6 is displaced and, at the same time, in each case, the other non-heated bar 15b or 15a is deformed. As such, the deformation caused by heating may be both a stretching and a curving of the heated bar. The following description of the operation of the valve assumes that the deformation is a stretching; however, the operation of the valve in the case of a curving is exactly analogous and does not need to be explained specifically.

When the bar 15a is heated with the aid of its resistance wire 16 and is, at the same time, stretched, the slide 6 is displaced in the direction of its right stop. At the same time, the left leg 9a displaces the ball 13 from its place on the left valve seat 14a. The force that has to be exerted on the ball 13 for this purpose is low because the direction of displacement of the ball is virtually perpendicular to the normal direction of the orifice of the valve seat 14a that is parallel to the line C. As may be appreciated, the angle between the normal direction and the displacement direction of the ball is the nearer to 90°, the smaller the diameter of the valve seat 14a is in comparison with the diameter of the ball 13. The diameter of the valve seat should, if possible, be no larger than half the diameter of the ball 13.

The displacement of the slide 6 leading to the displacement of the ball 13 from the valve seat 14a has the effect, at the same time, that the leg 9b moves away from the right valve seat 14b, so that sufficient space becomes available at this valve seat 14b so that the ball 13 can descend onto it and close it. As soon as the leg 9a has pushed the ball 13 over somewhat more than half its excursion between the two valve seats 14a, 14b, the ball 13 is acted upon by the force of the leaf spring 19 and, if present, by a flow of the fluid from the inlet connection to the outlet connections in the direction of the right valve seat 14b and descends on the latter. Excursion of the ball 13 is, in this case, almost twice as great as the excursion over which the bar 15a has to drive the ball 13.

Because the lateral chambers 12a, 12b communicate with the central chamber 11 through gaps between the housing wall and the legs 9a, 9b, the fluid pressure in the lateral chambers 12a, 12b is always the same as in the central chamber 11. Consequently, during the displacement of the ball 13, the bars 15a, 15b do not have to work counter to a pressure difference between the chambers.

Because the lateral chambers 12a, 12b communicate with the central chamber 11, the resistance wires 16 of the bars 15a, 15b are surrounded normally by the fluid flowing through the valve and are cooled by the fluid. When the fluid is a liquid, however, it may be evaporated when the resistance wires are in operation and may, thus, form a thermally insulating bubble around the bar 15a or 15b to be heated. After the resistance wires 16 have been switched off, the bar 15a, 15b can be cooled rapidly again, in that evaporated fluid surrounding it is flushed away by the flow running through the valve and is replaced by liquid fluid.

Figure 4:
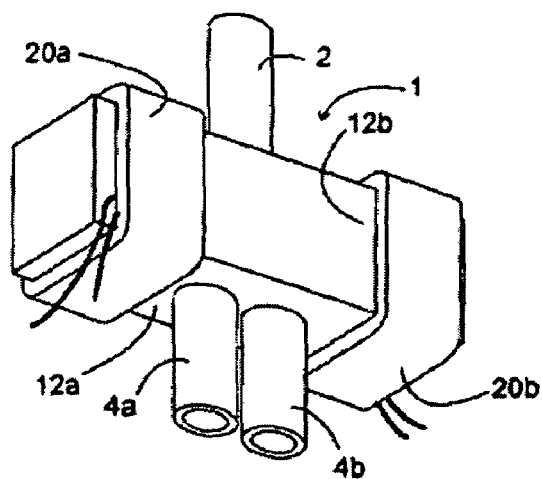
FIG. 4 is a fragmentary, perspective view of a second embodiment of a multi-way valve according to the invention.

FIG. 4 shows a second embodiment of the multi-way valve according to the invention in a perspective view similar to that of FIG. 1. In this embodiment, there are no electrical leadthroughs; instead, the walls of the housing 1 are closed with the exception of the inlet and outlet connections 2, 4a, 4b. Resistance wire windings 20a, 20b are disposed respectively around the lateral chambers 12a, 12b on the housing 1. Thus, in the second embodiment, a bar 15a, 15b of form memory alloy is heated indirectly by the diffusion of heat from a resistance wire winding through the housing 1 and through the fluid contained in the respective lateral chamber 12a, 12b. The heating of a form memory alloy element, therefore, obviously takes up more time than in the embodiment of FIGS. 1 to 3, but this is not necessarily an impediment for a use of the solenoid valve in a refrigerant circuit, for example, for a household refrigerator 100, (FIG. 1), because there, as a rule, markedly fewer than one switching operation of the multi-way valve per minute is necessary and, also, switching delays in the region of a few tens of seconds are acceptable. The lengthening of the reaction time has against it the advantage of markedly more cost-effective manufacture and a longer expected service life of the multi-way valve because the electrical leadthrough is never dispensed with.

To accelerate the heating of the bars 15a, 15b functioning as actuators, it is conceivable to produce these, together with the entire housing 1, in one piece from form memory alloy.

Figure 5:
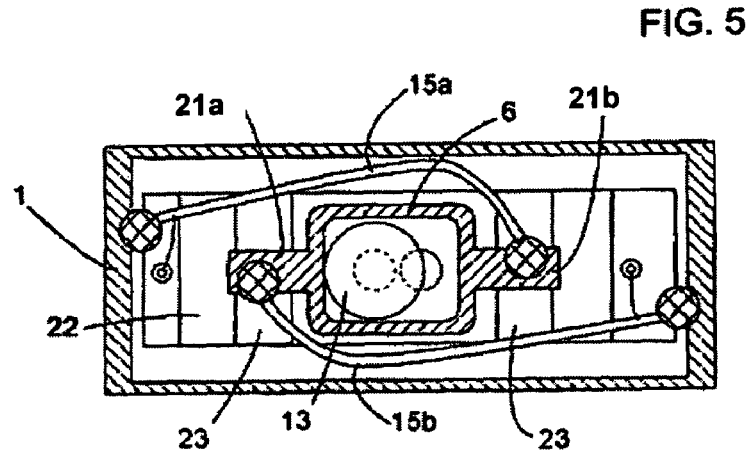
FIG. 5 is a fragmentary, cross-sectional view, similar to that of FIG. 2, through a third embodiment of a multi-way valve according to the invention.

FIG. 5 shows a third embodiment of the multi-way valve according to the invention by a section similar to that of FIG. 2. The slide 6 here is in the form of a frame that surrounds the ball 13 on four sides. In each case, first ends of bars 15a, 15b of a form memory alloy are fastened to lateral extensions 21 of the slide 6. Two resistance wires wound around the bars 15a, 15b and supplied with current in each case through a conductor guided through the housing are not illustrated in FIG. 5 for the sake of simplicity. The bars 15a, 15b extend in each case laterally past the slide 6 as far as that end of the housing 1 that faces away from the first end of the respective bar 15a, 15b. The second ends of the bars 15a, 15b are fastened to the extensions 21 in each case. Thus, in comparison with the length of the housing 1, the length of the bars 15a, 15b is substantially larger than in the embodiment of FIGS. 1 to 3, and a stroke of the slide 6 that is greater in relation to the length of the housing 1 can, therefore, also be driven. To guide the movement of the slide 6 linearly, a channel 22 is recessed into the bottom of the housing 1, and two plates 23 integrally formed onto the extensions 21a, 21b lie displaceably with slight play in the channel 22.

We claim:

1. A multi-way valve, comprising:
  a housing having an inlet, a plurality of outlets and valve seats associated with a respective one of said outlets, said housing defining a chamber fluidically connected to said valve seats;
  a closing member movable between said valve seats, the valve directing fluid flow from the inlet to one of the plurality of outlets when the closing member is in a first condition and from the inlet to another of the plurality of outlets when the closing member is in a second condition; and
  at least one actuator of a form memory alloy that, under heating, displaces said closing member from one of said valve seats to another of said valve seats in a displacement direction transverse to a normal direction of at least one of said valve seats.

2. The multi-way valve according to claim 1, wherein said closing member is spherical.

3. The multi-way valve according to claim 1, further comprising a slide operatively connected to said at least one actuator, said closing member being held in said slide, said actuator displacing said slide to, thereby, displace said closing member.

4. The multi-way valve according to claim 1, further comprising a slide operatively connected to said at least one actuator, said closing member held by said slide, said actuator displacing said slide to, thereby, displace said closing member.

5. The multi-way valve according to claim 3, wherein:
said slide defines a receptacle therewithin; and
said closing member is held within said receptacle.

6. The multi-way valve according to claim 3, wherein:
said valve seats are two valve seats;
said closing member moves in said slide in said displacement direction; and
a freedom of movement of said closing member in said slide is less than a distance between said two valve seats.

7. The multi-way valve according to claim 6, further comprising a spring-elastic element operatively connected to said closing member and exerting a force on said closing member counteracting displacement of said closing member from each of said valve seats.

8. The multi-way valve according to claim 1, further comprising a spring-elastic element operatively connected to said closing member and exerting a force on said closing member counteracting displacement of said closing member from each of said valve seats.

9. The multi-way valve according to claim 7, wherein:
said chamber has a first side wall;
said valve seats are disposed on said first side wall; and
said spring-elastic element acts on said closing member in a direction of said first side wall.

10. The multi-way valve according to claim 8, wherein:
said chamber has a first side wall;
said valve seats are disposed on said first side wall; and
said spring-elastic element acts on said closing member in a direction of said first side wail.

11. The multi-way valve according to claim 7, wherein said spring-elastic element is a leaf spring.

12. The multi-way valve according to claim 8, wherein said spring-elastic element is a leaf spring.

13. The multi-way valve according to claim 1, wherein:
said at least one actuator is a plurality of actuators; and
an electric heating device is provided for each of said actuators and selectively heats a respective one of said actuators.

14. The multi-way valve according to claim 13, wherein said heating devices are heating resistors wound around each of said actuators.

15. The multi-way valve according to claim 14, wherein said heating devices are to be cooled in direct contact by fluid flowing through the valve.

16. The multi-way valve according to claim 14, wherein:
fluid flows through said inlets to said chamber and out said outlets;
said heating devices are disposed in said housing; and
said heating device are to be cooled in direct contact by fluid flowing through said housing.

17. The multi-way valve according to claim 13, wherein at least part of said heating device is disposed outside said housing.

18. The multi-way valve according to claim 13, wherein said heating devices are disposed outside said housing.

19. The multi-way valve according to claim 1, wherein said at least one actuator is of a one-piece form memory alloy.

20. The multi-way valve according to claim 1, wherein:
said housing and said at least one actuator is connected; and
said at least one actuator is of a one-piece form memory alloy.

21. In a refrigerating machine having a refrigerant circuit with a plurality of evaporators, a switching device comprising:
a multi-way valve disposed in the refrigerant circuit and fluidically connected to at least one of said evaporators, said multi-way valve having:
a housing having an inlet, a plurality of outlets and valve seats associated with a respective one of said outlets, said housing defining a chamber fluidically connected to said valve seats, said inlet and outlets fluidically connected to said refrigerant circuit;
a closing member movable between said valve seats, the valve directing fluid flow from the inlet to one of the plurality of outlets when the closing member is in a first condition and from the inlet to another of the plurality of outlets when the closing member is in a second condition; and
at least one actuator of a form memory alloy that, under heating, displaces said closing member from one of said valve seats to another of said valve seats in a displacement direction transverse to a normal direction of at least one of said valve seats.

22. The multi-way valve according to claim 1, including a slide operatively connected to said at least one actuator, said slide laterally moveable in said housing, said slide forming a central chamber and at least two lateral chambers in said housing, one lateral chamber on each side of said central chamber, said closing member being held in said slide in said central chamber, said actuator displacing said slide to thereby, displace said closing member.

23. The multi-way valve according to claim 22, wherein said closing member is a substantially spherical ball.

24. The multi-way valve according to claim 23, including said slide defining a receptacle therewithin and said closing member is held within said receptacle.

25. The multi-way valve according to claim 22, including said central chamber and said two lateral chambers in fluid communication with each other in said housing.

26. The multi-way valve according to claim 22, including said slide formed of an electrically nonconductive material.

27. The refrigerating machine according to claim 21, including a slide operatively connected to said at least one actuator, said slide laterally moveable in said housing, said slide forming a central chamber and at least two lateral chambers in said housing, one lateral chamber on each side of said central chamber, said closing member being held in said slide in said central chamber, said actuator displacing said slide to, thereby, displace said closing member.

28. The refrigerating machine according to claim 27, wherein said closing member is a substantially spherical ball.

29. The refrigerating machine according to claim 28, including said slide defining a receptacle therewithin and said closing member is held within said receptacle.

30. The refrigerating machine according to claim 27, including said central chamber and said two lateral chambers in fluid communication with each other in said housing.

31. The refrigerating machine according to claim 27, including said slide formed of an electrically nonconductive material.

32. A multi-way valve, comprising:

a housing forming a chamber and including an inlet, a first outlet having a first valve seat, and a second outlet having a second valve seat;

a slide being movably supported within the chamber and defining a receptacle;

a spherical closing member retained within the receptacle and being movable in response to movement of the slide between a first condition, in which the closing member engages the first valve seat to restrict fluid flow to the first outlet, and a second condition, in which the closing member engages the second valve seat to restrict fluid flow to the second outlet, the valve directing fluid flow from the inlet to the second outlet when the closing member is in the first condition and from the inlet to the first outlet when the closing member is in the second condition; and at least one actuator including a form memory alloy coupled between the housing and the slide and moving the closing member between the first and second conditions in response to selective heating of the form memory alloy.

33. The multi-way valve according to claim 32, wherein:

said at least one actuator includes a plurality of actuators; and an electric heating device including heating resistors would around each of said actuators, the heating device selectively heating a respective one of said actuators to move the closing member in a desired direction.

34. The multi-way valve according to claim 33, wherein the actuators and heating devices are exposed to fluid flowing through the valve to cool the actuators and heating devices by direct contact.

* * * * *